United States Patent

Nechanicky

[11] 4,087,075
[45] May 2, 1978

[54] VALVE ASSEMBLY

[76] Inventor: Iwa Nechanicky, 73 Willowdale St., Sault Ste. Marie, Ontario, Canada

[21] Appl. No.: 720,173

[22] Filed: Sep. 2, 1976

[30] Foreign Application Priority Data

Apr. 22, 1976 Canada .................................. 250795

[51] Int. Cl. .............................................. F16k 31/50
[52] U.S. Cl. .................................... 251/214; 251/267; 277/113; 277/114
[58] Field of Search ............... 251/214, 266, 267, 274; 277/113, 114

[56] References Cited

U.S. PATENT DOCUMENTS

| 344,816 | 7/1886 | Cole | 251/214 |
|---|---|---|---|
| 473,554 | 4/1892 | Holly | 277/113 |
| 1,699,036 | 1/1929 | Welsh | 277/114 |
| 1,801,353 | 4/1931 | Lane et al. | 277/114 |
| 2,744,775 | 5/1956 | Bredtschneider | 277/113 |
| 3,429,555 | 2/1969 | Wrenshall | 251/214 |

Primary Examiner—Martin P. Schwadron
Assistant Examiner—G. L. Walton
Attorney, Agent, or Firm—Pollock, Vande Sande & Priddy

[57] ABSTRACT

A novel self-tightening seal arrangement for a gate valve, parallel valve or the like. A stuffing box chamber containing sealing material is located within the valve head, which takes advantage of the internal pressure of the valve for improved sealing. A sleeve is provided upon the valve spindle and moves upwardly with the valve blocking element as the latter is raised to open the valve, continued raising of the blocking element forcing the sleeve to engage and compress the sealing material in the stuffing box chamber. Locking means are provided to prevent the sleeve from withdrawing as the valve is closed by lowering the blocking element, and the compression upon the sealing material is thus maintained. By fully raising the blocking element after the normal opening function of the valve and thus periodically increasing the compression upon the sealing material, the normal tendency of the material to lose its normal resiliency and sealing effect can be compensated for in a simple and effective manner.

7 Claims, 3 Drawing Figures

U.S.Patent    May 2, 1978    Sheet 3 of 3    4,087,075

VALVE ASSEMBLY

This invention relates to a novel self-tightening arrangement for a valve of the type utilizing a fluid conduit and a blocking element mounted upon one end of a valve spindle which is adapted to be moved axially to insert or withdraw the blocking element from the conduit. Common examples of such a valve are the gate valve, parallel valve and globe valve. Generally, axial movement of the spindle to control penetration of the blocking element within the conduit is effected by threadedly engaging the spindle with the valve housing, so that turning the spindle in one direction or the other affects the appropriate axial movement thereof. In order to render the valve leakproof, the spindle normally passes through a stuffing box chamber within the valve housing, the chamber being filled with a sealing material which is maintained under pressure. The extent of such pressure is of importance in determining the effectiveness of the seal and a difficulty commonly encountered with this type of valve arrangement is the maintenace of the sealing material under sufficient compression to prevent the passage of fluid therepast. With many types of sealing material, the pressure thereon requires to be periodically increased by small increments to maintain an effective seal and with most conventional valve arrangements this is often impractical or requires a specific maintenance operation which may be inconvenient and time-consuming. An object of the present invention is to provide an arrangement whereby the pressure upon the sealing material is automatically maintained and adjusted as required during the aging of the material, simply by extension of the normal opening operation of the valve.

Thus according to the present invention, I provide a valve assembly comprising a valve body including a valve conduit, a a valve housing and a stuffing box chamber within said housing. A valve spindle passes through said housing and said stuffing box chamber and a valve conduit blocking element is located at one extremity of said spindle. The spindle is free to rotate in a clockwise or counterclockwise direction to move said blocking element towards or away from said stuffing box chamber in accordance with the direction of rotation of said spindle and to vary the extent of penetration of said blocking element into said valve conduit. A packing material is retained under compression within said stuffing box chamber. A sleeve member is slidably located upon said spindle between said stuffing box chamber and said blocking element, whereby said sleeve member is urged towards said stuffing box chamber to exert a compressive force upon said sealing material when said blocking element is moved theretowards. Locking means are located upon said valve body adjacent said sleeve, such locking means adapted to cooperate with complementary formations upon said sleeve to permit movement of said sleeve towards said sealing material and to prevent movement of said sleeve away from said material.

Preferably, the locking means located upon said valve body comprises an internally toothed locking ring through which the sleeve passes and which cooperates with serrations of generally saw-tooth or ratchet tooth cross-section extending annularly of the sleeve in such manner that the inwardly extending teeth of the ring act in the manner of pawls upon the sleeve serrations, permitting the sleeve to move past the ring in the direction of the sealing material but preventing retraction of same therefrom.

In addition to the automatic adjustability and maintenance of the pressure upon the sealing material which is provided by the structure of the invention, by locating the stuffing box chamber and sealing material within the valve head the internal pressure of the valve is also used to advantage for improved sealing.

The invention will now be described further by way of example only and with reference to the accompanying drawings wherein.

Figure 1:
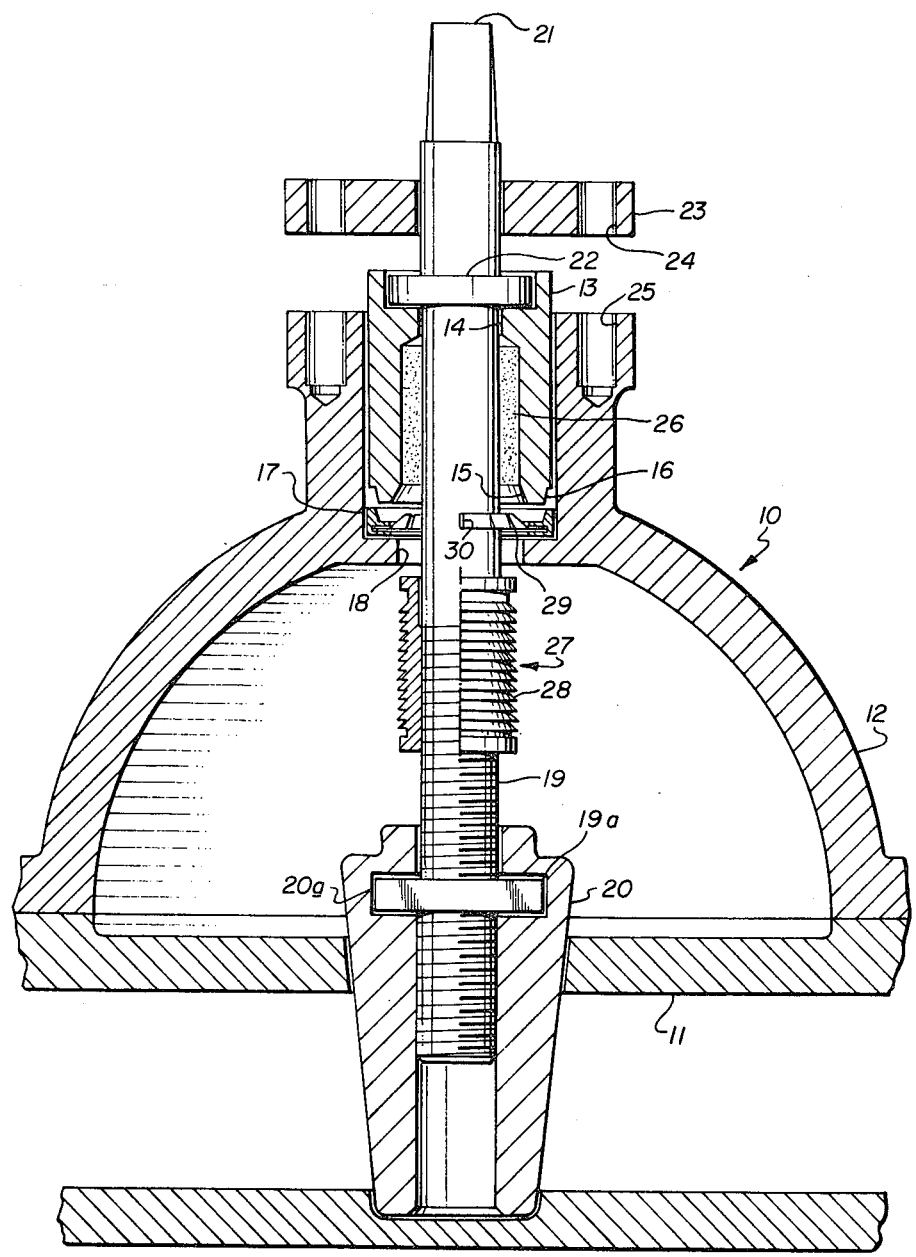
FIG. 1 is a view (partly in cross-section) of a valve assembly according to one embodiment of the invention, shown in partially exploded view.

Referring now to the drawings, and particularly to FIG. 1 thereof, the valve assembly illustrated therein comprises a valve body 10, which includes a valve conduit 11 attached to a housing 12 in conventional manner. The housing receives a cylindrical insert 13, which is shaped to define a stuffing box chamber. The insert 13 has an inwardly extending annular flange 14 close to its upper extremity, and its inner surface is bevelled at its lowered extremity as at 15, for a purpose which will hereinafter become apparent. An annular notch 16 is formed in the outer surface of the insert 13, at its lower extremity, and this notch is engageable with a complementarily shaped ring 17 of rubber or similar material, which in turn seats upon an inwardly extending annular flange 18 upon the housing 12. Alternatively, the ring 17 may be in the form of a conventional O-ring, as will be apparent to those skilled in the art (see the embodiment of FIG. 3).

A shaft 19 passes axially through the insert 13, and carries upon its lower end a valve blocking element 20 and upon its upper end a flattened portion 21 which is engageable with a handle or wrench to enable turning of the shaft by an operator. Turning of the shaft is translated in conventional manner into up and down movement of the valve blocking element 20 to vary its penetration of the valve conduit 11. To effect such vertical movement, the lower end of the shaft 19 is threaded and is threadedly engaged with a nut 19a. The nut 19a is received in the blocking element 20 through a complementarily shaped slot 20a open to the outside wall of the blocking element 20. Thus rotation of the shaft 19 is translated to vertical movement of the nut 19a and, consequently, of the element 20. In an alternative arrangement, the blocking element 20 is fixed with respect to the shaft 19 and both the shaft 19 and element 20 move vertically together. This is achieved by forming the upper region of the shaft with threads which engage with a stationary threaded member upon the housing 12. This arrangement, however, has the disadvantage over the arrangement illustrated that the seal between the shaft and housing must accommodate vertical motion of the shaft in addition to the normal rotational movement, and this requires a considerably more efficient seal. However, neither arrangement is critical with respect to the efficiency of the invention, which simply requires that there be means for translating rotational motion of the shaft to vertical movement of the valve blocking element.

Returning to the specifically shown embodiment, the shaft is provided with an enlarged annular portion 22 extending therearound, which fits within the upper portion of the insert 13 and seats upon the flange 14. A collar 23 is located over the shaft and is provided with bolt holes 24 which may be aligned with threaded holes 25 in the housing 12 to permit the collar to be bolted tightly down into the housing 12. As may be seen from the drawings, securement of the collar upon the housing forces the insert 13 downwardly to seat firmly upon and compress the ring 17 of sealing material, which thus prevents passage of fluid between insert 13 and housing 12.

As will be apparent to those skilled in the art, it is comparatively simple to seal the space between the insert 13 and housing 12, since these elements are non-rotatable and are securely capped by the collar 23. However, it is more difficult to prevent passage of fluid between the shaft 19 and the insert 13, since the tolerances must be such that the shaft is freely rotatable therein. The normal manner of sealing the passage between the shaft and the insert would be to pack the inner enlarged portion of the sleeve 13, between the insert and the shaft, with a sealing material and to maintain such material under compression to completely seal the space against the passage of fluid therethrough. Due to the gradual loss of resilience which occurs with most sealing materials, the compression exerted upon the material becomes progressively less effective with time and eventually the seal will leak unless the compression is increased thereupon or the material is replaced. In those cases where adjustability of the compression upon the sealing material is provided, it is usually necessary to at least partially dismantle the valve assembly to effect adjustment of the compression and the means provided for such adjustment are often relatively complicated.

Figure 2:
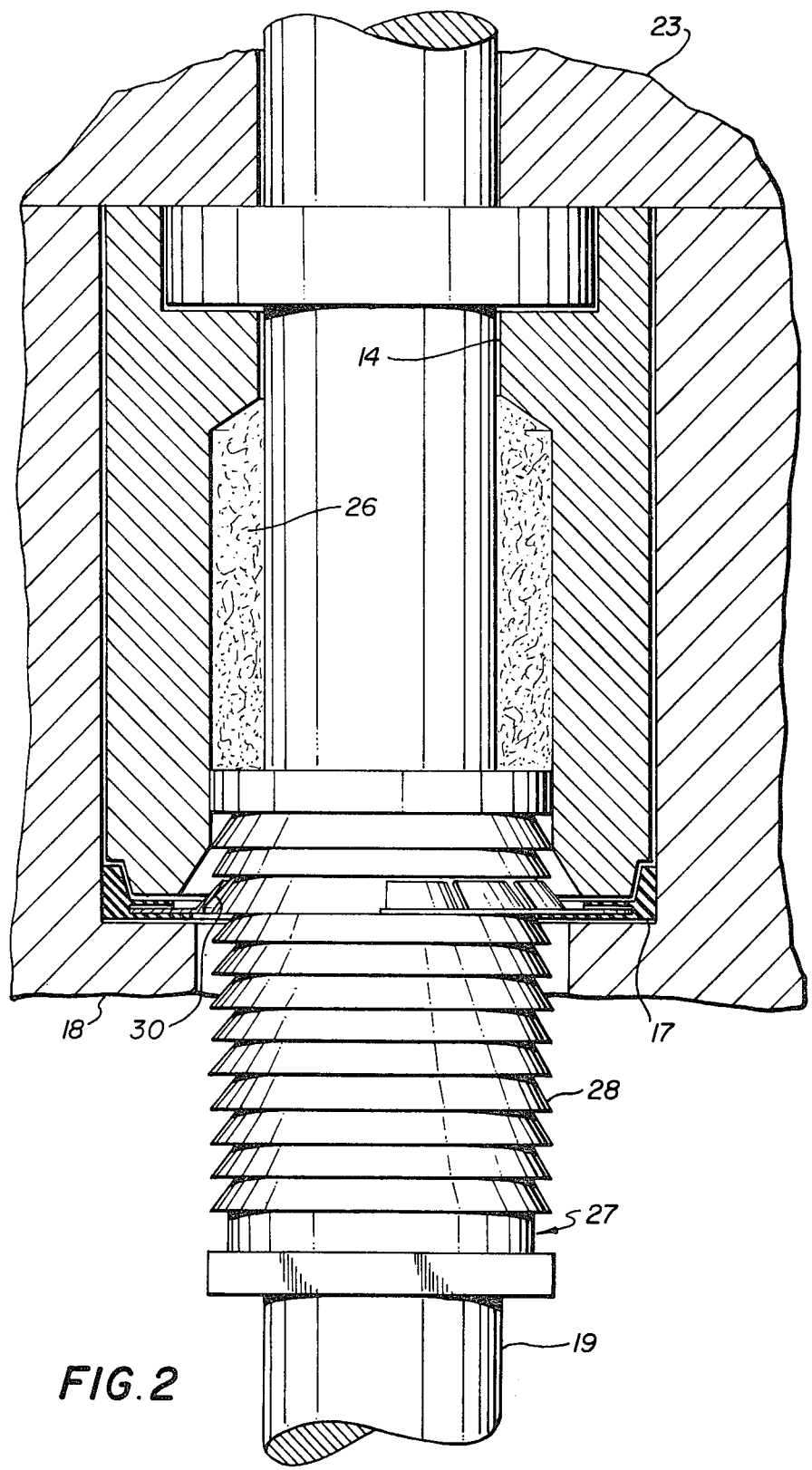
FIG. 2 is a detail of a portion of the valve assembly illustrated in FIG. 1, with the components thereof assembled in operable relationship.

In the arrangement illustrated in the drawings, the sealing material is shown at 26, and substantially fills the stuffing box chamber formed between the shaft 19 and insert 13. A serrated sleeve 27 is slidably mounted upon the shaft 19 and is of slightly less diameter than the inner diameter of the insert 13. Thus, as the valve shaft is turned to raise the valve blocking element 20 and withdraw same from the valve conduit 11, the element 20 moves upwardly towards the stuffing box and, after clearing the conduit 11, forces the upper end of the sleeve 27 into contact with the lower extremity of the packing material 26 within the stuffing box chamber. Continued rotation of the shaft then raises the valve blocking element 20 even further and continues to push the sleeve 27 into the stuffing box chamber — thus compressing the packing material 26 (see particularly FIG. 2). Of course, it is desired that the sleeve 27 remain in its raised position exerting the compressive force upon the material 26, even when the blocking element 20 is moved back downwardly into its blocking mode. To achieve the latter object, the sleeve 27 is formed with annular serrations 28 therearound, such serrations being of generally saw-tooth or ratchet-tooth cross-section having their leading edges flared away from the direction of upward travel of the sleeve.

An internally toothed locking ring 29 is embedded in the sealing ring 17 (unless the ring 17 is a conventional O-ring as mentioned above), and the teeth 30 thereof are flared upwardly at an angle of about 45°, approximating the angle of the leading edges of the serrations 28. The teeth 30 are of a springy resilient material, such as springy metal or plastic and form a ring around the sleeve which is of such diameter that the teeth snap into place beneath the serrations 28 as the sleeve 27 moves upwardly through the locking ring 29. The trailing edges of the serrations 28, being formed with saw-tooth or ratchet-tooth orientation (i.e. at 90° to the axis of the sleeve or raked in the direction of the leading edges), permit the teeth 30 to lodge firmly thereunder and thus prevent downward movement of the sleeve. Therefore, the teeth 30 function as a series of individual pawls upon the serrations 28, permitting the serrations to move past the teeth 30 in an upward direction only (again, see FIG. 2).

Figure 3:
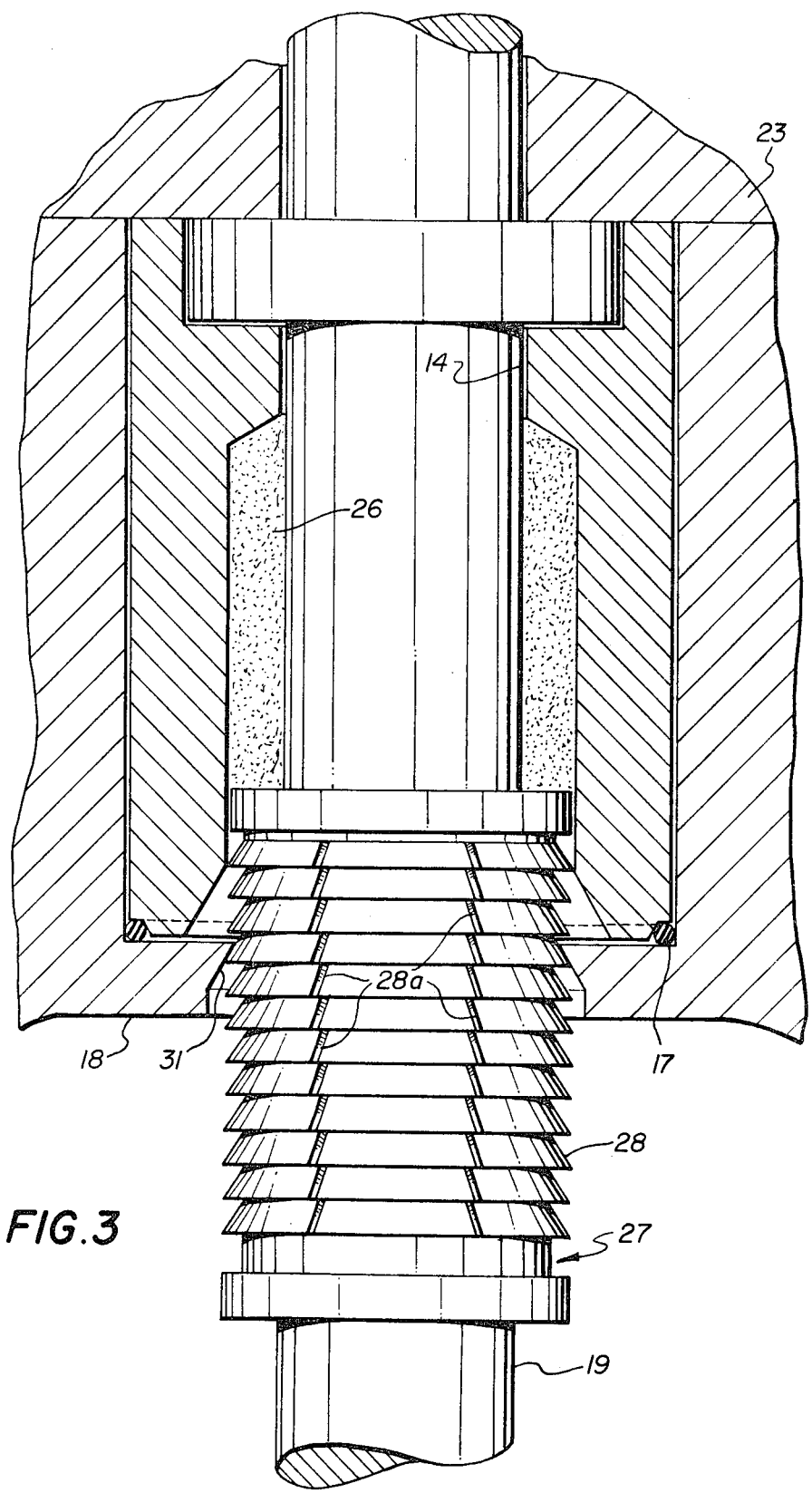
FIG. 3 is a variation of the embodiment illustrated in FIG. 2.

In an alternative embodiment shown in FIG. 3, the locking ring 29 may be replaced by a solid annular ridge 31 which may be machined or cast around the inner edge of the annular flange 18. In this arrangement, slots or grooves 28a are formed in the serrations 28 to allow the latter to "give" and constrict as they pass through the annular ridge 31. To further facilitate this mechanism and avoid unnecessary wear upon the serrations 28, the latter are preferably formed to be somewhat more pliant than those of the sleeve in FIGS. 1 and 2, and this may be achieved by use of a more flexible material or by forming the serrations of lesser thickness.

Various alternative arrangements to those hereinbefore described will be apparent to one skilled in the art. For example, whilst the preferred material for the seal 26 is cotton rope filled with synthetic fat or the like, specially prepared Teflon (trademark for polytetrafluoroethylene), or graphite asbestos rope, the choice of preferred material will readily be apparent to the artisan, having regard to the environment wherein the valve is to be used.

The embodiments of the invention in which an exclusive property or privilege is claimed are defined as follows:

1. A valve assembly comprising a valve body including a valve conduit, a valve housing and a stuffing box chamber within said housing, a valve spindle passing through said housing and said stuffing box chamber, a valve conduit blocking element located at one extremity of said spindle, said spindle being free to rotate in a clockwise or counterclockwise direction to move said blocking element towards or away from said stuffing box chamber in accordance with the direction of rotation of said spindle and to vary the extent of penetration of said blocking element into said valve conduit, a packing material retained under compression within said stuffing box chamber, a sleeve member slidably located upon said spindle between said stuffing box chamber and said blocking element for movement with said blocking element towards said stuffing box chamber, whereby said sleeve member is urged towards said stuffing box chamber to exert a compressive force upon said sealing material when said blocking element is moved theretowards, and locking means located upon said valve body adjacent said sleeve member, said locking means adapted to cooperate with complementary formations upon said sleeve to permit movement of said sleeve towards said sealing material and to prevent movement of said sleeve away from said material, said complementary formations comprising serrations of generally saw-tooth or ratchet-tooth cross-section extending annularly of said sleeve member and having leading edges flared outwardly away from the direction of travel of said sleeve toward said sealing material, and said locking means comprising an internally annular member through which said sleeve member passes, said internally annular member having an inwardly extending annular surface region remote from said packing material and sloping at an angle approximating that of said leading edges of said serrations, said serrations or said annular member having sufficient flexibility to yieldingly permit passage of said serrations through said annular member and to snap into locking engagement between said annular member and the trailing edges of said serrations.

2. The valve assembly of claim 1, wherein said spindle is longitudinally fixed with respect to said valve housing and is provided with a threaded portion upon its region passing through said blocking element, said blocking element being threadedly engaged with said threaded portion of said spindle whereby rotation of said spindle is translated into longitudinal motion of said blocking element towards or away from said stuffing box chamber as aforesaid.

3. The valve assembly of claim 1, wherein said internally annular member comprises a toothed locking ring through which said sleeve is adapted to pass, said locking ring having internally extending springy teeth which are inwardly flared at an angle approximating that of said leading edges of said serrations and which snap into locking engagement with the trailing edge of each serration after passage of said serration through said locking ring towards said sealing material.

4. The valve assembly of claim 3, wherein said spindle is longitudinally fixed with respect to said valve housing and is provided with a threaded portion upon its region passing through said blocking element, said blocking element being threadedly engaged with said threaded portion of said spindle whereby rotation of said spindle is translated into longitudinal motion of said blocking element towards or away from said stuffing box chamber as aforesaid.

5. a valve assembly comprising a valve body including a valve conduit, a valve housing and a stuffing box chamber within said housing, a valve spindle passing through said housing and said stuffing box chamber, a valve conduit blocking element located at one extremity of said spindle, said spindle being free to rotate in a clockwise or counterclockwise direction to move said blocking element towards or away from said stuffing box chamber in accordance with the direction of rotation of said spindle and to vary the extent of penetration of said blocking element into said valve conduit, a packing material retained under compression within said stuffing box chamber, a sleeve member slidably located upon said spindle between said stuffing box chamber and said blocking element for movement with said blocking element towards said stuffing box chamber, whereby said sleeve member is urged towards said stuffing box chamber to exert a compressive force upon said sealing material when said blocking element is moved theretowards, and locking means located upon said valve body adjacent said sleeve member, said locking means adapted to cooperate with complementary formations upon said sleeve to permit movement of said sleeve towards said sealing material and to prevent movement of said sleeve away from said material, said complementary formations comprising flexible serrations of generally saw-tooth or ratchet-tooth cross-section extending annularly of said sleeve and having leading edges flared outwardly away from the direction of travel of said sleeve toward said sealing material and being grooved or slotted at intervals therearound to permit flexure of said serrations towards the axis of said sleeve, and said locking means comprising an annular bevelled ridge through which said sleeve is adapted to pass, said ridge being bevelled at its side remote from said packing material at an angle approximating that of said leading edges of said serrations and said ridge having a substantially planar face in its side adjacent said packing material whereby the trailing edge of each serration snaps into locking engagement with said planar face of said ridge after passage of said serration through said ridge towards said sealing material.

6. A valve assembly comprising a valve body including a valve conduit, a valve housing and a stuffing box chamber within said housing, a valve spindle passing through said housing and said stuffing box chamber, a valve conduit blocking element located at one extremity of said spindle, said spindle being longitudinally fixed with respect to said valve housing and provided with a threaded portion upon its region passing through said blocking element, said blocking element being threadedly engaged with said threaded portion of said spindle whereby rotation of said spindle is translated into longitudinal motion of said blocking element towards or away from said stuffing box chamber and varying the extent of penetration of said blocking element into said valve conduit, a packing material retained under compression within said stuffing box chamber, a sleeve member slidably located upon said spindle between said stuffing box chamber and said blocking element for movement with said blocking element towards said stuffing box chamber, whereby said sleeve member is urged towards said stuffing box chamber to exert a compressive force upon said sealing material when said blocking element is moved theretowards, and locking means located upon said valve body adjacent said sleeve member, said locking means adapted to cooperate with complementary formations upon said sleeve to permit movement of said sleeve towards said sealing material and to prevent movement of said sleeve away from said material, said complementary formations comprising flexible serrations of generally saw-tooth or ratchet-tooth cross-section extending annularly of said sleeve and having leading edges flared outwardly away from the direction of travel of said sleeve toward said sealing material and being grooved or slotted at intervals therearound to permit flexure of said serrations towards the axis of said sleeve, and said locking means comprising an annular bevelled ridge through which said sleeve is adapted to pass, said ridge being bevelled at its side remote from said packing material at an angle approximating that of said leading edges of said serrations and said ridge having a substantially planar face in its side adjacent said packing material whereby the trailing edge of each serration snaps into locking engagement with said planar face of said ridge after passage of said serration through said ridge towards said sealing material.

7. A valve assembly comprising a valve body including a valve conduit, a valve housing and a stuffing box chamber within said housing, said stuffing box chamber being defined by a cylindrical insert which is located within said valve housing and which seats upon a resilient sealing ring within said housing, a valve spindle passing through said housing and said stuffing box chamber, a valve conduit blocking element located at one extremity of said spindle, said spindle being free to rotate in a clockwise or counterclockwise direction to move said blocking element towards or away from said stuffing box chamber in accordance with the direction of rotation of said spindle and to vary the extent of penetration of said blocking element into said valve conduit, a packing material retained under compression within said stuffing box chamber, a sleeve member slidably located upon said spindle between said stuffing box chamber and said blocking element for movement with said blocking element towards said stuffing box chamber, whereby said sleeve member is urged towards said stuffing box chamber to exert a compressive force upon said sealing material when said blocking element is moved theretowards, and locking means located upon said valve body adjacent said sleeve member, said locking means adapted to cooperate with complementary formations upon said sleeve to permit movement of said sleeve towards said sealing material and to prevent movement of said sleeve away from said material, said complementary formations comprising serrations of generally saw-tooth or ratchet-tooth cross-section extending annularly of said sleeve and having leading edges flared outwardly away from the direction of travel of said sleeve toward said sealing material, and said locking means comprising an internally toothed locking ring through which said sleeve is adapted to pass, said locking ring having internally extending springy teeth which are inwardly flared at an angle approximating that of said leading edges of said serrations and which snap into locking engagement with the trailing edge of each serration after passage of said serration through said locking ring towards said sealing material, and the teeth of said locking ring extending inwardly from an annular ring portion embedded in said resilient sealing ring.

* * * * *